United States Patent [19]

Ferris et al.

[11] Patent Number: 5,561,760
[45] Date of Patent: Oct. 1, 1996

[54] SYSTEM FOR LOCALIZING FIELD REPLACEABLE UNIT FAILURES EMPLOYING AUTOMATED ISOLATION PROCEDURES AND WEIGHTED FAULT PROBABILITY ENCODING

[75] Inventors: Thomas M. Ferris; Andrew L. Gross; Mark E. Hill; Douglas E. Torrens, all of Tucson, Ariz.

[73] Assignee: International Business Machines Corporation, Armonk, N.Y.

[21] Appl. No.: 310,540

[22] Filed: Sep. 22, 1994

[51] Int. Cl.[6] .................................................. G06F 13/00
[52] U.S. Cl. ........................................................ 395/183.01
[58] Field of Search ............................. 395/575, 182.06, 395/183.01, 185.07, 264.4, 267.7, 181, 183.02, 184.01; 364/264.4, 267.7

[56] References Cited

U.S. PATENT DOCUMENTS

| | | | |
|---|---|---|---|
| 3,928,830 | 12/1975 | Bellamy et al. | 235/153 |
| 4,687,988 | 8/1987 | Eichelberger et al. | 324/73 |
| 4,766,595 | 8/1988 | Gollomp | 371/23 |
| 4,817,092 | 3/1989 | Denny | 371/11 |
| 4,881,230 | 11/1989 | Clark et al. | 371/20.1 |
| 5,253,184 | 10/1993 | Kleinschnitz | 364/550 |
| 5,293,556 | 3/1994 | Hill et al. | 364/551.01 |
| 5,394,543 | 2/1995 | Hill et al. | 395/575 |
| 5,404,503 | 4/1995 | Hill et al. | 395/575 |

OTHER PUBLICATIONS

U. D. Perera, "Systems Reliability and Availability Prediction and Comparison w/ Field Data for a Mid–Range Computer", 1993.

J. A. Bulow, "Fault Locator and Weighting System", IEEE, 1991.

J. Combes et al., "Automatic Analysis of Error Records in a Communication Controller for Optimum Maintenance", IBM Technical Disclosure Bulletin, vol. 31, No. 6, Nov. 1988, pp. 138–141.

S. M. Douskey, "Recording Failure Information on Returned Hardware", IBM Technical Disclosure Bulletin, vol. 32, No. 7, Dec. 1989, pp. 227–228.

*Primary Examiner*—Robert W. Beausoliel, Jr.
*Assistant Examiner*—Norman M. Wright
*Attorney, Agent, or Firm*—Baker, Maxham, Jester & Meador

[57] ABSTRACT

A system for the automated isolation and report of a Field Replaceable Unit (FRU) and/or a Replaceable Component (RC) responsive to a stream of Fault Symptom Code (FSCs) produced in response to a system fault. The process is entirely automated and can be stored in microcode to allow immediate updating of FSC to FRU/RC correspondences responsive to system design revisions. Selected FRU/RC isolation procedures are included in the FRUs/RCs for automatic execution as part of the isolation process. Failure probability data, including probability distribution data, are included in each FRU/RC to support an alternative weighted failure probability (WFP) isolation scheme to isolate a faulty FRU/RC even when the automated isolation procedures do not provide an unambiguous result.

11 Claims, 9 Drawing Sheets

SYSTEM FOR LOCALIZING FIELD REPLACEABLE UNIT FAILURES EMPLOYING AUTOMATED ISOLATION PROCEDURES AND WEIGHTED FAULT PROBABILITY ENCODING

BACKGROUND OF THE INVENTION

1. Field of the Invention

This invention relates generally to the automated isolation of faulty Field Replaceable Units (FRUs) in an electromechanical system responsive to a stream of system performance error data and specifically to a microcode-embodied process for isolating failed or failing FRUs using automated isolation testing procedures and a weighted combination of FRU probability-of-failure data.

2. Discussion of the Related Art

Modern fault detection practice for complex electronic equipment involves automated performance monitoring and the creation and display of fault codes responsive to equipment failures. Usually, such fault codes are reviewed by a maintenance technician and interpreted according to a published maintenance manual. Based on trouble-shooting maintenance tables, FRU isolation procedures are manually selected and performed and any resulting new fault codes are then reinterpreted according to the maintenance manual. This process continues iteratively until the maintenance technician succeeds in replacing all faulty FRUs.

The faulty FRU isolation process presents two fundamental problems. The first problem is the need for continual updates to published maintenance manuals to reflect system design changes. As system components and FRUs are redefined or improved, failure of a particular FRU may introduce new symptoms, which must be interpreted using existing or modified fault codes. Also, as field maintenance experience grows, particular fault codes may be reinterpreted as isolating different FRUs, thereby requiring changes to product field documentation. Serious maintenance delays may arise when product documentation updates are not tightly coupled with system design changes.

The second fundamental problem relates to the FRU isolation process itself. The usual practice is to report system faults as a series of predefined symptoms or Fault Symptom Codes (FSCs). Any particular FSC may arise because of the failure of any one or more of a large plurality of FRUs. The laborious process of isolating the faulty FRU from such a large plurality is usually accomplished by selecting and performing several predetermined isolation test procedures, each of which gives rise to additional FSCs that may then be analyzed in turn to narrow the field of candidate FRUs. While the test procedures are themselves automated, the usual practice is to isolate faulty FRUs through some combination of manual FSC analyses and manual selection and initiation of isolation tests.

Practitioners in the art have proposed several automated improvements to the fault isolation procedures known in the art. For instance, in U.S. Pat. No. 3,928,830, L. R. Bellamy et al. disclose a simple diagnostic system that automatically monitors FRUs for failures or out-of-tolerance conditions, latching up a display to show which FRUs are out of tolerance. In U.S. Pat. No. 4,687,988, Edward B. Eichelberger et al. disclose a weighted random-pattern testing technique that isolates failures in VLSI circuit devices through correlation of an output signature, representing a collection of the output responses from each output terminal in parallel, with predetermined pseudo-random patterns at the circuit device inputs.

These two test procedure concepts are combined in U.S. Pat. No. 4,766,595, wherein Bernard P. Gollomp adds a simple behavior model incorporating predetermined design knowledge of the unit undergoing test. Gollomp's specification-based diagnostic approach reduces the number of isolation test procedures automatically performed to isolate a faulty FRU. Essentially, Gollomp combines a symptom-based diagnostic approach with a specification-based diagnostic approach to balance the number of automatic diagnostic tests against the usual requirement for human technical judgment during manually-initiated testing.

Other "expert system" approaches to the isolation problem include the methods disclosed by Mark E. Clark et al. in U.S. Pat. No. 4,881,230 and by Luan J. Denny in U.S. Pat. No. 4,817,092. These techniques employ decision trees and an expert system to further refine the identification of a faulty FRU, to eliminate all functional components of the faulty FRU and to automatically execute-diagnostic test procedures to assure that no extraneous errors from other system elements are causing the fault symptom.

Further, S. M. Douskey ("Recording Failure Information on Returned Hardware", IBM Technical Disclosure Bulletin, Vol. 32, No. 7, pp. 227–228, December 1989) describes a method for using a nonvolatile RAM in each FRU to permanently store failure history data for use in board-level factory analysis and repair. J. Combes, et al. ("Automatic Analysis of Error Records in a Communication Controller for Optimum Maintenance", IBM Technical Disclosure Bulletin, Vol. 31, No. 6, pp. 138–141, November 1988) disclose an improvement for the automatic analysis of Fault Symptom Code (FSC) error record by a service processor, which generates a reference code that directly denominates the faulty FRU. Combes et al. suggest automated translation of a FSC into a FRU identification but neither teach nor suggest the automated isolation of FRUs, instead teaching the manual selection and performance of diagnostic testing in the usual manner.

More recently, in U.S. Pat. No. 5,293,556, Fletcher L. Hill et al. disclose a knowledge-based FRU management scheme that provides a guided testing procedure by which service personnel are prompted to manually select candidates for FRU swaps or replacements. FRU change and swap detection is prompted as a function of FRU memory scanning together with embedded database query activity and, for swap activity, virtual Composite Failure Events are created and maintained to manage post-swap failure symptoms. Post-swap and post-change validation logic verify the correct positioning and functioning of the target FRUs. Hill et al. neither consider nor suggest automated isolation testing, instead describing a sophisticated expert system for use in prompted manual maintenance.

Similarly, in U.S. Pat. No. 5,253,184, Donald Kleinschnitz discloses a failure and performance tracking system that assists in failure isolation by using an expert system with rules, hypotheses and collective historical data. Kleinschnitz provides memory in each FRU to accumulate and store performance history data. Data is also accumulated to show failed operational components within each FRU as well as any prior maintenance activity in which the FRU came under suspicion. Kleinschnitz teaches the use of a series of retry attempts, each failure of which produces a new set of fault symptom data that successively narrows the field of suspect FRUs. While Kleinschnitz suggests the use of statistical failure data stored within each FRU, he neither considers nor suggests the use of this statistical failure data for FRU isolation but instead merely suggests using such data to predict the next likely time of failure for the particular FRU. Essentially, Kleinschnitz teaches a neural-network based maintenance system that adapts to changes in failure symptoms over time, gradually learning more useful interpretations for each failure symptom code. He neither considers nor suggests the automated isolation testing of a faulty system responsive to fault system codes and provides no specific isolation procedures other than a general neural-based expert system that performs an isolation analysis responsive to a fault persistence counter reading that exceeds a predetermined persistence threshold. Human interaction is required because the system merely guides the maintenance engineer in his evaluation of a failed FRU and the maintenance engineer responds to the system with his human observations.

Advantageously, the expert-system approach to failure isolation does much to resolve the first field publication coupling problem mentioned above because the expert system can readily adjust to accommodate system design changes affecting FSC interpretation. Moreover, improved isolation testing automation minimizes the requirement for manual maintenance engineering involvement, thereby minimizing system downtime during repair. Nevertheless, there is still a clearly-felt need in the art for more fully automatic isolation of faulty FRUs and of the faulty Replaceable Components (RCs) within each FRU. The related unresolved problems and deficiencies are clearly felt in the art and are solved by this invention in the manner described below.

SUMMARY OF THE INVENTION

The system of this invention completely automates the FRU isolation process responsive to a series of Fault Symptom Codes (FSCs) configured according to this invention. Each FSC contains a Field Replaceable Unit Identifier (FID) as part of its data and may contain one or more component identifiers (CIDs). Each FID refers to one or more FRUs and each CID refers to one or more RCs. A potentially large list of FIDs and/or CIDs can be produced as a result of a single failure. The preferred embodiment of this system is implemented in microcode, thereby automatically updating the FSC to FID/CID mapping procedure whenever the system is upgraded or changed without revisions to product or maintenance documentation.

It is an object of the system of this invention to automatically isolate and report the identity of a faulty FRU and, where possible, a faulty Replaceable Component (RC). It is a feature of the system of this invention that Weighted Failure Probability (WFP) data is used to identify a single FID as the most probable Failure Candidate (FC) even when predetermined isolation test procedures (IPs) give ambiguous results. It is a feature of the system of this invention that two independent isolation schemes (IP and WFP) are employed alternatively and in concert to guarantee the automatic identification of a FRU/RC for replacement whenever a system fault occurs.

It is another object of the system of this invention to eliminate any difficulties arising from delays in issuing updated product field documentation when revising FSC definitions. It is a feature of the system of this invention that it is preferably implemented in microcode to return a Failure Candidate (FC) identification directly responsive to a series of FSCs. As FSC definitions are revised, the updated microcode reflects the corresponding changes to FC identifiers, bypassing the product field documentation updates.

The foregoing, together with other objects, features and advantages of this invention, will become more apparent when referring to the following specification, claims and the accompanying drawing.

BRIEF DESCRIPTION OF THE DRAWING

For a more complete understanding of this invention, reference is now made to the following detailed description of the embodiments as illustrated in the accompanying drawing, wherein:

FIG. 5, comprising

DETAILED DESCRIPTION OF THE PREFERRED EMBODIMENTS

The following detailed description of the system and method of this invention uses acronyms, which are collected here for convenience.

Figure 1:
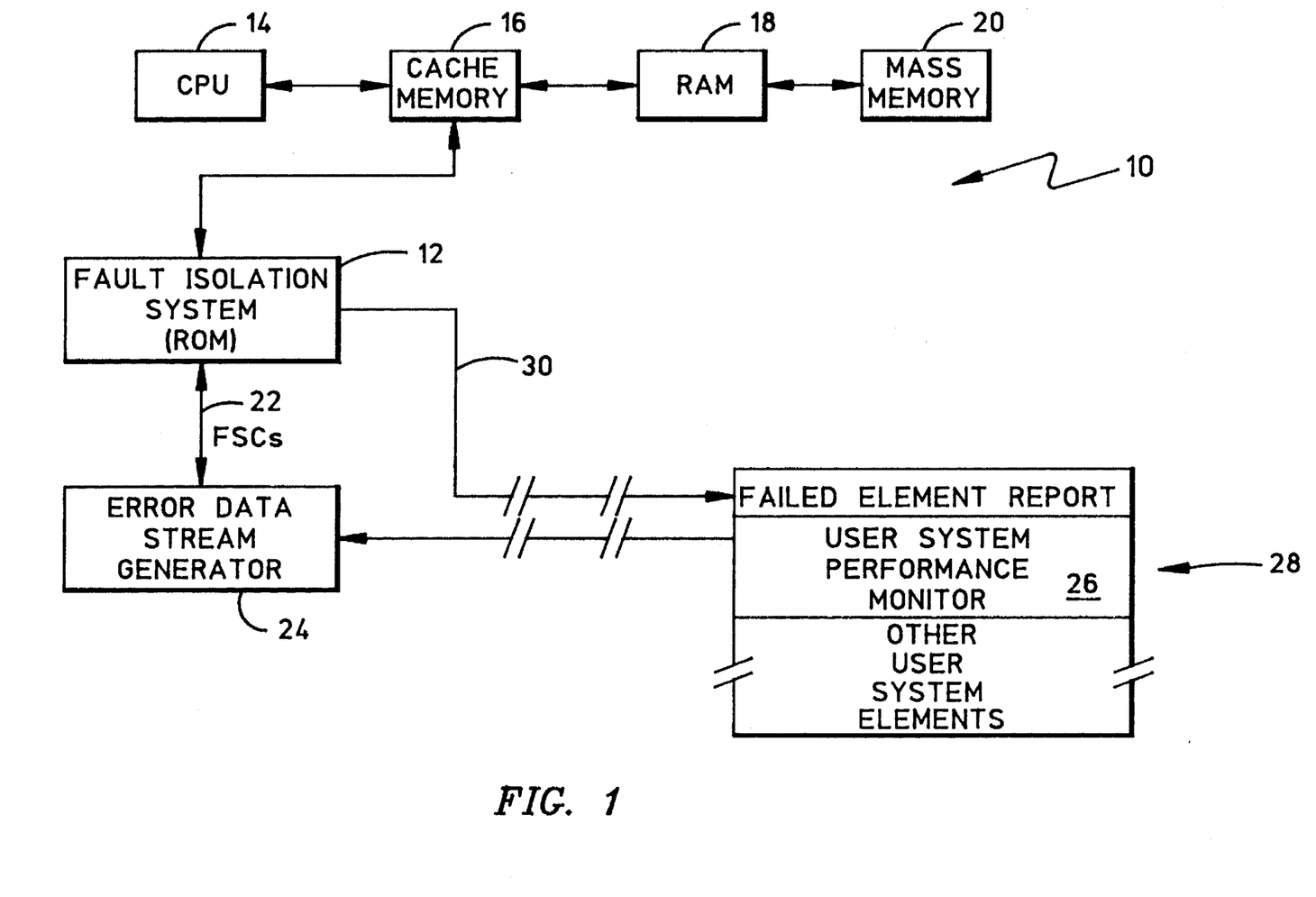
FIG. 1 is a functional block diagram showing an illustrative embodiment of a fault recovery system including the fault isolation system of this invention.

CID: factory-replaceable component unit identifier (comprising one or more RCs)
CPU: central processor unit
FC: failure candidate (FID or CID)
FID: field replaceable unit identifier (comprising one or more FRUs)
FRU: field-replaceable unit
FSC: fault symptom code
IP: isolation procedure
PD: probability data
RAM: random access memory
RC: replaceable component
ROM: read-only memory
VLSI: very large scale integration
WFP: weighted failure probability FIG. 1 shows an exemplary fault recovery system 10 employing the fault isolation system 12 of this invention. System 10 includes a central processing unit (CPU) 14 coupled to a cache memory 16 and therefrom to a random access memory (RAM) 18 and a mass memory 20. Fault isolation system 12 may, for example, be completely contained in read-only memory (ROM) and coupled therefrom through cache memory 16 to CPU 14 for execution in any usual manner known in the art for microcoded computer program embodiments.

Fault isolation system 12 requires a stream of Fault Symptom Codes (FSCs) at the input bus 22. The FSCs on bus 22 are created by an error data stream generator 24 responsive to data received from a user system performance monitor 26, which may be included in the user system 28 for which fault recovery is performed by system 10. The structure and performance of error data stream generator 24 and user system performance monitor 26 are not relevant to the detailed description of this invention and may be accomplished in any useful manner known in the art for providing a stream of FSCs at bus 22 responsive to element faults in user system 28. Fault isolation system 12 provides a failed element report, which is illustratively shown to be reported back to user system 28 on the output bus 30.

Figure 2:
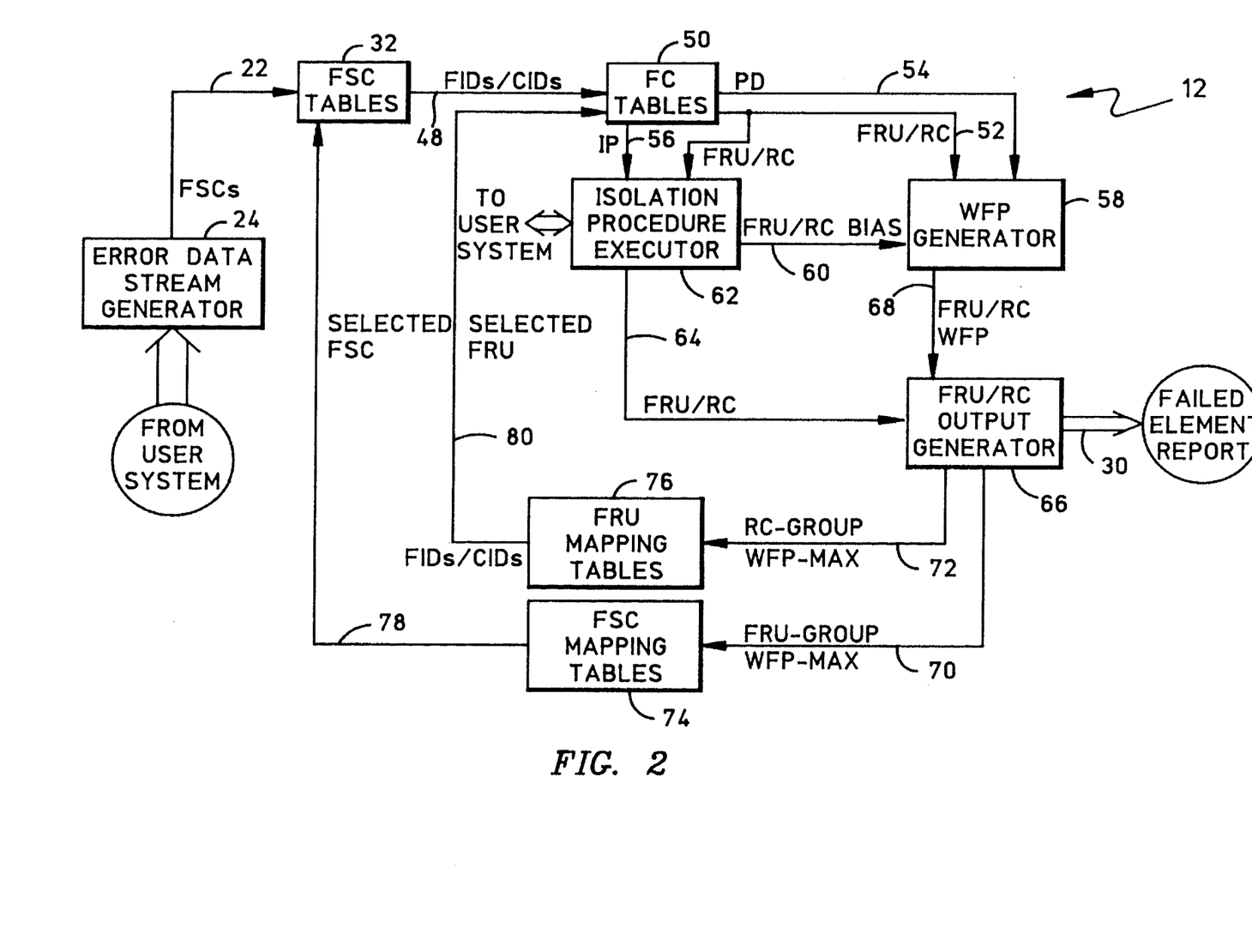
FIG. 2 is a functional block diagram showing an illustrative embodiment of the fault isolation system of this invention.

Fault isolation system 12 is shown in more detail in FIG. 2. The FSC stream on bus 22 is produced by error data stream generator 24 according to the FSC data specifications of this invention shown in FIGS. 3A–3F, which are now described.

Figure 3A:
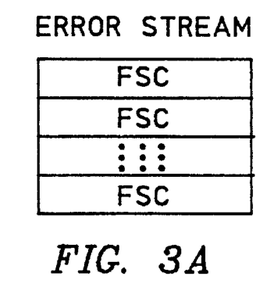
FIGS. 3A–3F illustrate the several data structures employed by the system of this invention.

The error data stream on bus 22 includes a series of FSCs substantially as shown in FIG. 3A. Generator 24 creates a series of FSCs responsive to a fault in user system 28. A single fault may result in generation of one, a few, or a large plurality of FSCs. The FSC plurality on bus 22 may be generated responsive to actual operation of user system 28 or responsive to execution of one or more isolation test procedures (IPs), as discussed hereinbelow.

In FIG. 2, the FSCs on bus 22 are presented to the FSC tables data object 32, which interprets each FSC in terms of one or more FRU identifiers (FIDs) and/or one or more RC identifiers (CIDs). Alternatively, each FSC on bus 22 may include embedded references to the associated FIDs and CIDs. The embodiment shown in FIG. 2 requires less data transfer on bus 22. Each FSC refers to data related to a FID or a CID, whether embedded on bus 22 or looked up in FSC tables data object 32. Each FID is herein denominated either a multiple-FRU FID or a single-FRU FID and contains sufficient information to designate to which of these categories it belongs. Similarly, each CID is herein denominated either a multiple-RC CID or a single-RC CID, each of which is self-identifying. Each multiple-FRU FID (and each multiple-RC CID by analogy) is herein denominated either "isolatable" or "non-isolatable" and each contains enough information to identify to which of these categories it belongs. All isolatable multiple-FRU FIDs (and all isolatable multiple-RC CIDs) contain data specifying one or more isolation test procedures (IPs) designed to isolate one of the several FRUs/RCs specified. Finally, each FID (CID) contains "failure probability data" for all FRUs (RCs) specified.

Figure 3B:
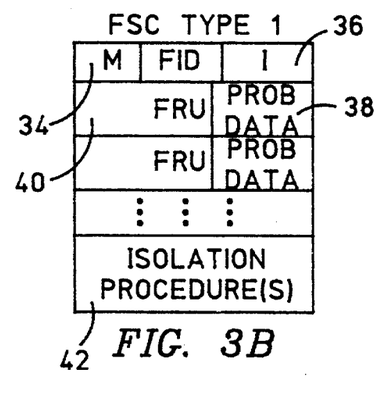

FIG. 3B shows an exemplary data specification for a typical isolatable multiple-FRU FID, which is arbitrarily designated as "FSC type 1." The FSC specification contains a field 34 to indicate the "multiple-FRU" character of the FSC. A field 36 indicates the "isolatable" character of the FSC. A field 38 specifies the "failure probability data" associated with the FRU denominated in the field 40. One or more additional FRUs are also listed within the type-1 FSC together with associated failure probability data. Finally, field 42 specifies the IPs associated with the type-1 FSC. That is, IP field 42 specifies the test procedures designed to identify which one of the plurality of FRUs listed in the type-1 FSC has failed.

Figure 3C:
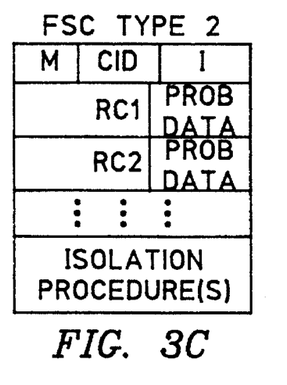

FIG. 3C shows an exemplary data specification for an isolatable multiple-RC CID, arbitrarily designated as a type-2 FSC. The architecture of the type-2 FSC in FIG. 3C is substantially analogous to that discussed above for the type-1 FSC shown in FIG. 3B.

Figure 3D:
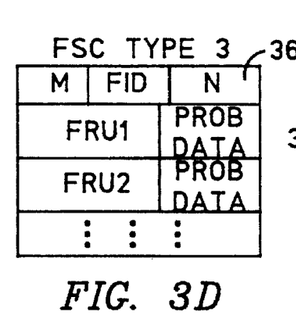

FIG. 3D shows an exemplary data specification for a non-isolatable multiple-FRU FID, arbitrarily designated as a type-3 FSC. Field 36 indicates the FSC to be "non-isolatable." IP field 42 is not included in the type-3 FSC, but a plurality of FRUs are listed with associated failure probability data.

Figure 3E:
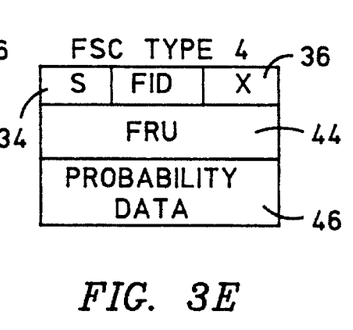
Figure 3F:
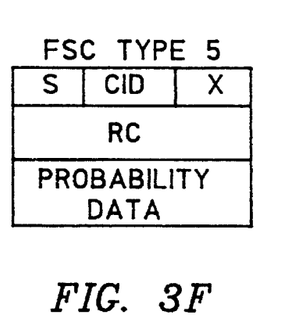

FIG. 3E shows an exemplary data specification for a single-FRU FID, arbitrarily designated as a type-4 FSC. Note that field 34 designates the FSC as "single-FRU," which implies that the contents of field 36 are irrelevant because no FRU-isolation is necessary. The type-4 FSC specifies only the single FRU shown in field 44 and includes associated failure probability data in field 46. FIG. 3F shows an exemplary data specification for a single-RC CID, arbitrarily designated as a type-5 FSC. The single-RC CID may be understood by analogy with the type-4 FSC of FIG. 3E.

With these specifications for the FSC error data stream at bus 22, the remainder of fault isolation system 12 in FIG. 2 can now be described. As embodied in FIG. 2, FSC tables 32 provide the FID or CID code for each FSC arriving on bus 22. This FID/CID code is forwarded on bus 48 to the Failure Candidate (FC) tables data object 50. FC tables object 50 accepts each FID/CID code on bus 48 and produces on bus 52 the entire group of associated data, including one or more FRUs or RCs together with the associated probability data (PD) on bus 54. If the incoming FID is an isolatable multiple-FRU FID (e.g., as shown in FIG. 3B), then the associated IP data is also produced by FC tables object 50 on bus 56. It can be readily appreciated that all such FRU/RC designators, all such associated PDs and all such IPs may alternatively be included in the FID data block received on bus 48 if desired, or even included in the FSC data block on bus 22. FC tables 50 reduces the necessary data transmission on bus 48 by looking up stored data responsive to an incoming FID or CID code. Clearly, FSC tables object 32 and FC tables object 50 may alternatively be combined into a single look-up table object (not shown).

The FRU/RC data stream on the bus 52 and the associated PDs on bus 54 are presented to the weighted failure probability (WFP) generator 58, which produces a WFP value for each FRU and RC in the list by multiplying the associated probability of failure data on bus 54 by the number of times that the associated FRU/RC appears in the data stream on bus 52. WFP generator 58 also accepts FRU/RC count biases on the bus 60 to reduce the effective count for the associated FRU/RC.

For isolatable multiple-FRU FIDs (and isolatable multiple-RC CIDs), the associated IPs on bus 56 are presented to the isolation procedure executor 62, which causes execution of predetermined fault isolation test procedures at user system 28 (FIG. 1). Execution of such IPs itself may cause error data stream generator 24 to create a new series of FSCs on bus 22, which are forwarded through the system. The resulting FRU/RC stream on bus 52 is then presented to isolation procedure executor 62, which determines whether a single failed FRU/RC has indeed been isolated as the element responsible for the system fault. Other IP feedback techniques may be useful, including responses that either do or do not create new FSCs. In some instances, an IP may simply return a "no solution" response without new FSCs. If the IP does not succeed in isolating a single FRU/RC, then biasing signals are created and forwarded on bus 60 to generator 58 to reduce the WFP for the associated multiple-FRU FID. If the IP succeeds in identifying a single failed element, this element (FRU or RC) identity is forwarded on bus 64 to the FRU/RC output generator 66, which also receives the FRU/RC stream on bus 68 from WFP generator 58 together with the associated WFP for each.

Output generator 66 analyzes the incoming information on buses 64 and 68 to produce several outputs. If a FRU/RC is found on bus 64, it is presented in the failed element report at output bus 30. In the many other cases where no single FRU/RC is produced by isolation procedure executor 62, output generator 66 then organizes the FRU/RC data stream from bus 68, grouping the various elements according to their associated WFP. Before selecting the maximally probable (WFP-MAX) element for reporting out on bus 30, output generator 66 first forwards a statistically close group of elements for reconsideration to the FSC tables object 32 and/or FC tables object 50. This group is selected as follows.

The FRU/RC with the highest WFP value of WFP-MAX is identified as the most likely failing hardware element. However, other FRUs or RCs may be statistically close. The original probability of failure data for each FRU/RC include data describing a statistical deviation for FRUs and RCs. In one embodiment, all FRUs or RCs having WFPs within one standard deviation of WFP-MAX are included in the group of "statistically close" failure candidates (FCs). The standard deviation values are computed by first calculating a mean failure probability figure for all FRUs and another for all RCs. Each standard deviation is then found by calculating the square root of the difference of the squares of the individual FRU/RC probability of failure and the corresponding FRU/RC mean failure probability. This standard deviation may be scaled by dividing it by the number of FRUs (or RCs) minus one, or $$s = \left[ \frac{\Sigma (x_i - \bar{x})^2}{n-1} \right]^{1/2} = \left[ \frac{\Sigma x^2 - \frac{(\Sigma x)^2}{n}}{n-1} \right]^{1/2}$$

Once the FRU-group (or RC-group) is identified, the associated list is forwarded on buses 70 and 72 to FSC mapping tables object 74 and FRU mapping tables object 76, respectively. Objects 74 and 76 may, of course, be combined into a single mapping tables object. Mapping tables object 74 (76) selects a FSC (FRU) most closely associated with the corresponding FRU (RC) group. Each selected FSC is forwarded by FSC mapping table object 74 to FSC tables object 32 on bus 78, whereupon object 32 produces the associated FID/CID data on bus 48, reinitiating the failed element selection process at the FRU level. Similarly, FRU mapping tables object 76 selects the FRU most closely associated with the RC group presented on bus 72 and forwards the selected FRU on bus 80 to FC tables object 50, reinitiating the failed element selection process at the RC level.

The exemplary functional embodiment discussed above in connection with FIG. 2 may be entirely implemented as a combination of program and data objects within a microcode ROM. The functions of the various elements in FIG. 2 are arbitrarily partitioned and may be better understood with reference to the description of the process of this invention presented hereinbelow in connection with FIGS. 4 and 5.

Figure 4:
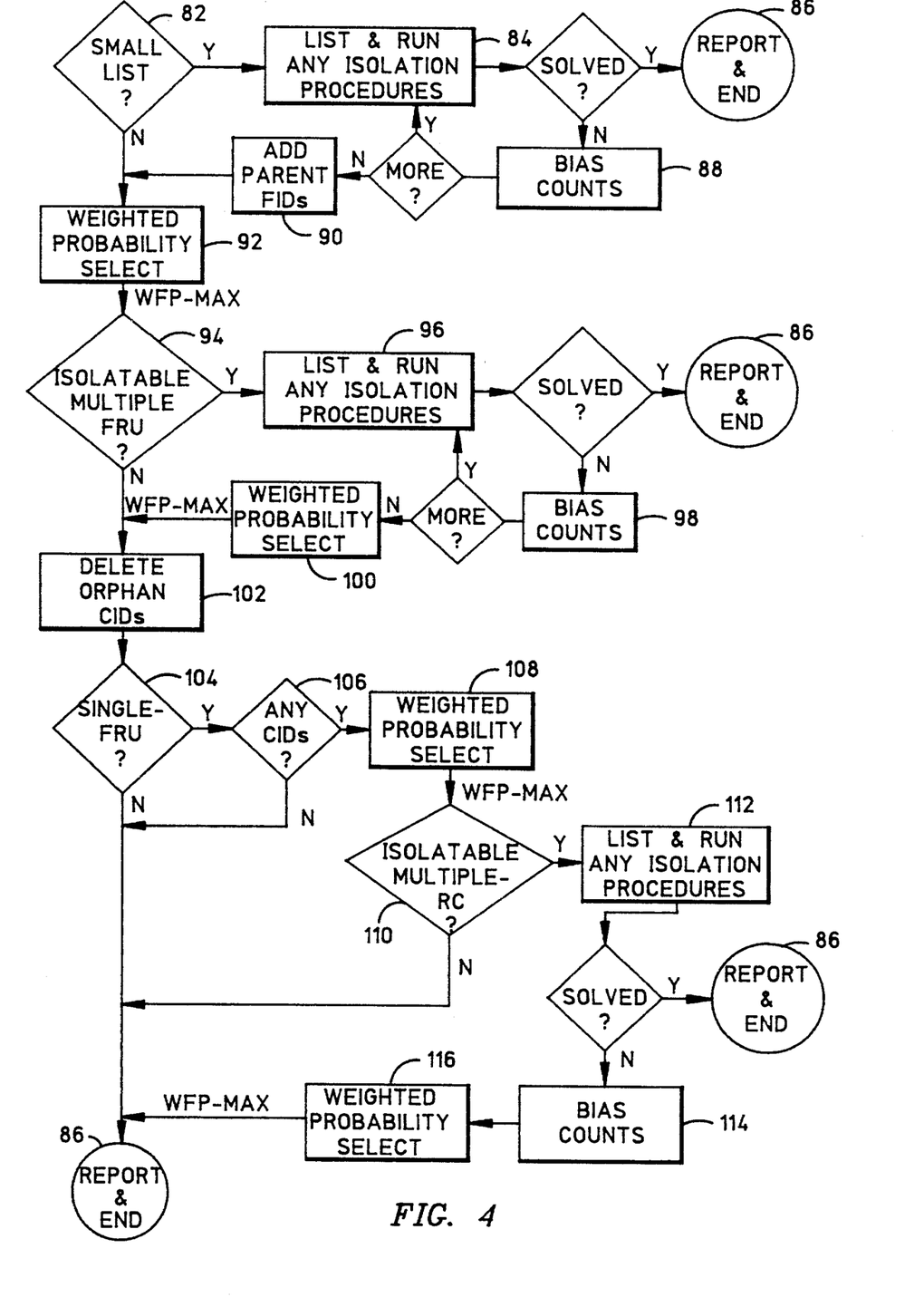
FIG. 4 is a functional block diagram of an exemplary embodiment of the process of this invention.

FIG. 4 shows an abbreviated functional block diagram of an exemplary embodiment of the fault isolation process of this invention. The first step 82 of the exemplary embodiment examines the size of the error stream. If the error stream is "small" (in one implementation, five FSCs constitute a small error stream) and the error stream includes one or more isolatable multiple-FRU FIDs, the IPs for each isolatable multiple-FRU FID are first executed in step 84 before decompaction and listing of FRU and RC elements. Step 84 includes (a) finding a multiple-FRU FID in the error stream, (b) storing it, and (c) executing one of the associated IPs. All CIDs in the stream are ignored by this FRU identification logic because CIDs are associated only with single-FRU FIDs, which do not refer to associated IPs. If the IP succeeds in identifying a failed FRU, this failed FRU is reported at step 86 and the entire procedure ends. If the IP fails to identify a single failed FRU, then step 88 biases the error stream frequency counts for the related FIDs and CIDs specified by the isolatable multiple-FRU FID, and iteratively returns to step 84 for the next FID, if any. The FRU/RC frequency counts are those accumulated from the error stream for the computation of weighted failure probability (WFP) in the manner described above in connection with WFP generator 58 (FIG. 2). After step 84 has exhausted the "short list," the process examines all CIDs in the stream and adds "parent" FIDs at step 90 when necessary. That is, step 90 insures that, for every CID in the CID list, the single-FRU FID to which it belongs is also in the FID list. This step also slightly adjusts the WFPs for "parent" FIDs because the parent FID is more likely to be failing if an associated CID was named in the error stream.

Finally, the procedure returns to the main "large" list process at step 92, wherein the WFPs are computed for each FID/CID in the error stream list, which for the "small" list also includes all FSCs generated by the execution of IPs in step 84. The "large" list FIDs may include multiple-FRU FIDs not yet decompacted or tested at step 92 because they include any multiple-FRU FID produced by grouping high-WFP FIDs together in step 92. The output of step 92 includes only the FID having a weighted failure probability equal to WFP-MAX and any CIDs in the stream. This maximally-probable FID may be an isolatable or a non-isolatable multiple-FRU FID or it may be a single-FRU FID.

At step 94, the maximally-probable FID is tested to determine if it is an isolatable multiple-FRU FID. If found to be so, the process then executes step 96, which is conceptually identical to step 84 discussed above. If an IP succeeds in identifying a single-FRU failure, the procedure then branches to final step 86 to report this failure. If an IP fails to identify a single FRU failure, the procedure branches to step 98, which biases the FID/CID counts in the manner discussed above for step 88. If no IP succeeds in finding a single failed element and after all associated FID/CID counts are appropriately adjusted to reflect this lack of success, then step 100 again calculates WFPs for each FID/CID using the new counts. Note that step 100, while identical to step 92, operates on a different list of FIDs/CIDs and different frequency counts because step 96 operates to generate a multiplicity of new FIDs.

Summarizing, the FSC list is tested at step 82 for size and, if found to be small, all FSCs are immediately listed and all IPs run in step 84. If the FSC list is large, this immediate IP execution is deferred (to save time) and instead is performed in step 96 for the maximally-probable FID only. This alternative approach is an important feature of the process of this invention because it avoids the unnecessary IP execution for a large number of isolatable multiple-FRU FIDs. Only the maximally-probable FID is decomposed and tested in step 96. For small FSC lists, where the WFP values have little significance, all IPs are executed in step 84 before computing any WFPs.

Although the output of step 100 is a maximally-probable single-FRU FID (or multiple-FRU FID comprising a group of high-WFP FRUs), the input to step 102 may also include a non-isolatable multiple-FRU FID from step 94. Accordingly, at step 102, all CIDs in the error stream list are re-examined for association with either the maximally-probable FID or the non-isolatable FID and "orphans" are deleted from the list. That is, all CIDs specifying RCs that are not elements of the maximally-probable (or non-isolatable) FID are deleted from the list to conserve downstream processing resources.

Following execution of step 102, the maximally-probable FID is examined at step 104 to determine whether it is a single-FRU FID from step 100 or a non-isolatable FID from step 92. If it is a single-FRU FID then the procedure next checks for the presence of CIDs in the list at step 106. If there are no CIDs or if the FID is not isolatable, the procedure immediately branches to final step 86 to report this result. The remainder of the process in FIG. 4 merely attempts to localize the fault to a RC within a known faulty FRU, using the same basic logic discussed above in connection with the earlier FRU identification process.

If steps 104 and 106 find CIDs and a maximally-probable single-FRU FID in the list, then step 108 immediately computes new WFP values for all CIDs and selects a maximally-probable CID. At step 110, the maximally-probable CID is examined to determine if it is an isolatable multiple-RC CID. If it is not, that is, if it is either a single-RC CID or a non-isolatable multiple-RC CID, then the process immediately branches to final step 86 to report this fact. However, if the maximally-probable CID is an isolatable multiple-RC CID, then step 112 stores (lists) it and runs any associated IPs. Step 112 is substantially identical to both earlier steps 84 and 96 that were applied to the FIDs in the error stream. If the IPs succeed in identifying a single failed RC, then the process branches immediately to final step 86 to report both the single failed FRU and the single failed RC. If the IPs do not succeed in isolating a single-RC CID, then step 114 biases the frequency counts for the associated CIDs before going to step 116, which recomputes the WFPs to account for the multiplicity of CIDs generated by step 112. The output of step 116 is a maximally-probable single-RC (or a multiple-RC "group") CID, which is immediately reported at final step 86. Step 116 is substantially identical to earlier steps 108, 100 and 92.

The abbreviated exemplary process in FIG. 4 demonstrates the essential features of the isolation process of this invention. That is, a maximally-probable FID/CID is selected using the WFP calculation, which is essentially equal to the predetermined failure probability of the FID/CID multiplied by the frequency of occurrence of that FID/CID in the error steam. Because some FIDs and CIDs include IPs with several elements, the process alternately stores the multiple-element FID/CID and executes associated IPs in attempting to directly isolate a single element. Whether or not the predetermined IPs find the failed element, the attempts (steps 84, 96 and 112) will adjust WFP values for some FIDs/CIDs and each may generate additional error stream data including a multiplicity of new FSCs, each of which would be processed according to the method of this invention to extract additional FID/CID frequency information and probability data. Thus, the two basic fault isolating steps (WFP select steps 92, 100, 108, 116 and IP execution steps 84, 96 and 112) are performed against one another to optimize the efficiency of the process of this invention.

Figure 5:
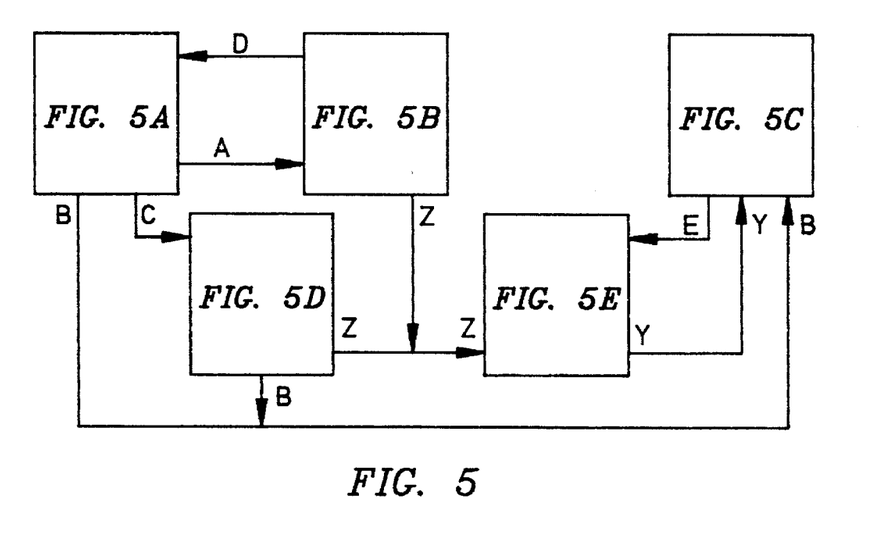

FIG. 5, including FIGS. 5A–5E, is a functional block diagram showing a preferred embodiment of the process of this invention, which is more precise but also more complex than the substantially similar exemplary process shown in FIG. 4.

Figure 5A:
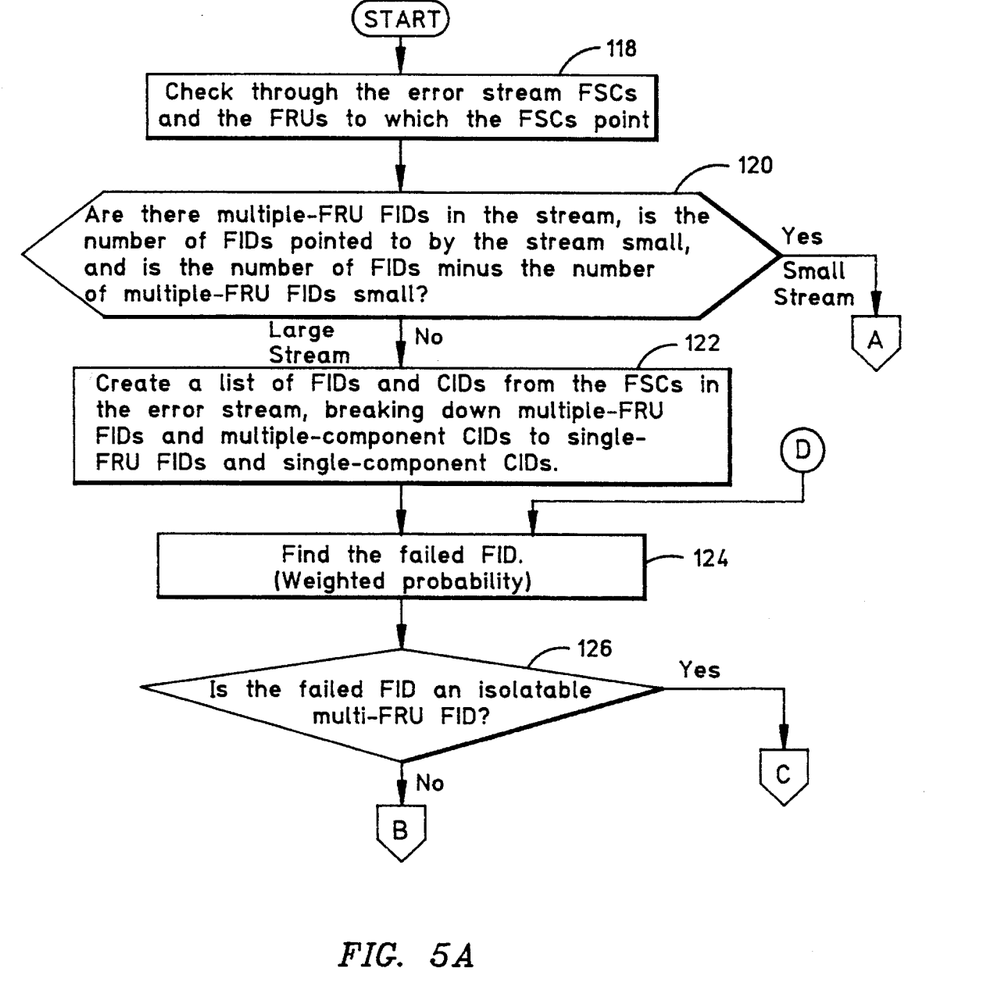
FIGS. 5A–5E, is a functional block diagram of a preferred embodiment of the process of this invention.

In FIG. 5A, step 118 scans the error stream FSCs and the associated FRUs. Step 120 tests the error stream characteristics to determine whether the embedded IPs or the WFP calculations should first be executed. If the error stream is too large to justify immediate IP execution, step 122 then creates a list of FIDs and CIDs from the FSCs and immediately decomposes the multiple-FRU FIDs and multiple-RC CIDs to generate single-FRU FIDs and single-RC CIDs. The single-element FIDs/CIDs are added to the initial list of FIDs from the FSCs from the original error stream. Step 124 then uses the augmented FID/CID list to calculate a WFP value for each FID/CID (equal substantially to the number of times that the FID/CID occurs in the entire list multiplied by the associated probability of failure). Step 124 selects a single FID/CID having WFP-MAX or, if necessary, assembles a statistically-close group of FCs as a multiple-FRU FID, which is then examined at step 126 to determine whether or not the maximally-probable FID is an isolatable multiple-FRU FID.

Figure 5B:
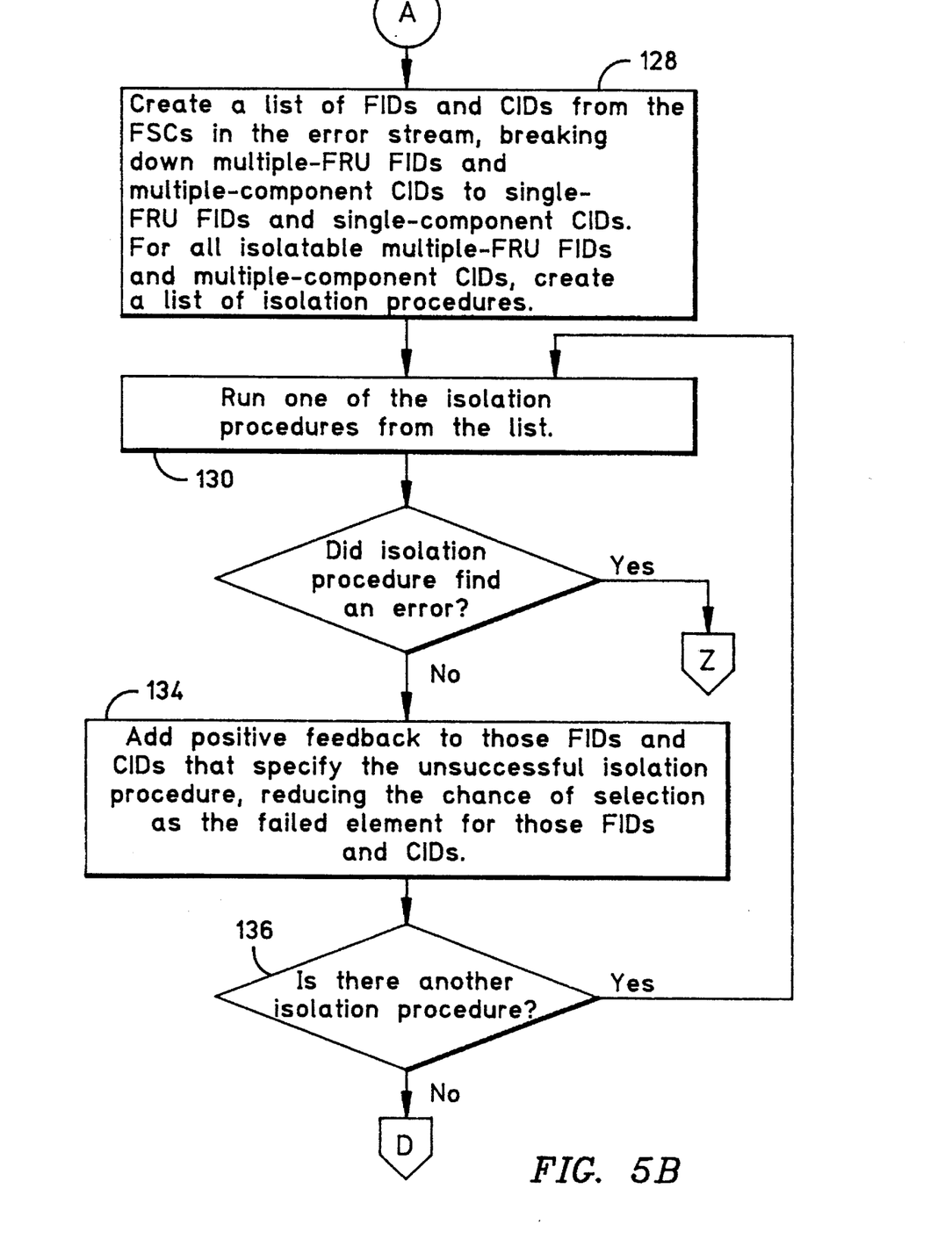

If step 120 determines that the original error stream is "small," then the process proceeds to step 128 in FIG. 5B, which immediately creates a list of all FIDs and CIDs from the error stream, decomposing all multiple-element FIDs/CIDs to create additional single-element FIDs/CIDs, and listing all IPs associated with isolatable multiple-element FIDs/CIDs. Step 128 is accomplished without first computing WFPs for the original FSCs or creating an IP list.

After creating the augmented list of FIDs/CIDs in step 128, step 130 then selects and executes one of the IPs from the list. If this IP finds a single-element failure, the procedure passes to step 132 in FIG. 5E, which selects the named FID/CID as the failed element for reporting purposes. If the isolation procedure does not unambiguously identify a single failed element, then step 134 adds positive feedback to those FIDs/CIDs that specify the unsuccessful IP to reduce the chance of selection as the failed element for those FIDs/CIDs and may also add new FSCs to the original error data stream. After biasing the associated counts, step 136 returns to execute the next IP from the list at step 130, iterating until the IP list is exhausted. After all IPs are executed, the error stream list has been (perhaps significantly) expanded with the addition of new FSCs created responsive to IP execution.

With this expanded list, step 124 in FIG. 5A only then computes WFPs for all FIDs (but not CIDs) in the list, and produces a high-WFP FRU grouping if necessary. If step 126 finds that the failed FID is an isolatable multiple-FRU FID, then the process proceeds to step 138 in FIG. 5D, which lists the IPs associated with the maximally-probable FID from step 124 of FIG. 5A. Step 140 then runs the first of the IPs in this list and proceeds to step 132 in FIG. 5E if an IP successfully identifies a single failed element. For each unsuccessful IP, step 142 then adds positive feedback to those FIDs/CIDs that specify the unsuccessful IP, thereby reducing the chance of selection as the failed element for those FIDs/CIDs. Steps 140–144 iterate until exhaustion of the IP list, at which point the entire error stream FSC list is augmented even more by FSCs generated responsive to step 140 execution of IPs.

At step 146, weighted failure probability (WFP) values are computed for all FIDs in the augmented list and the maximally-probable FID is selected. After selection of the FID with the WFP-MAX value, the process then proceeds to step 148 in FIG. 5C, which deletes all "orphan" CIDs that are not associated with the selected maximally-probable FID. Step 126 in FIG. 5A also proceeds directly to step 148 in FIG. 5C if the maximally-probable FID found in step 124 is either a single-FRU FID or a non-isolatable multiple-FRU FID.

Figure 5C:
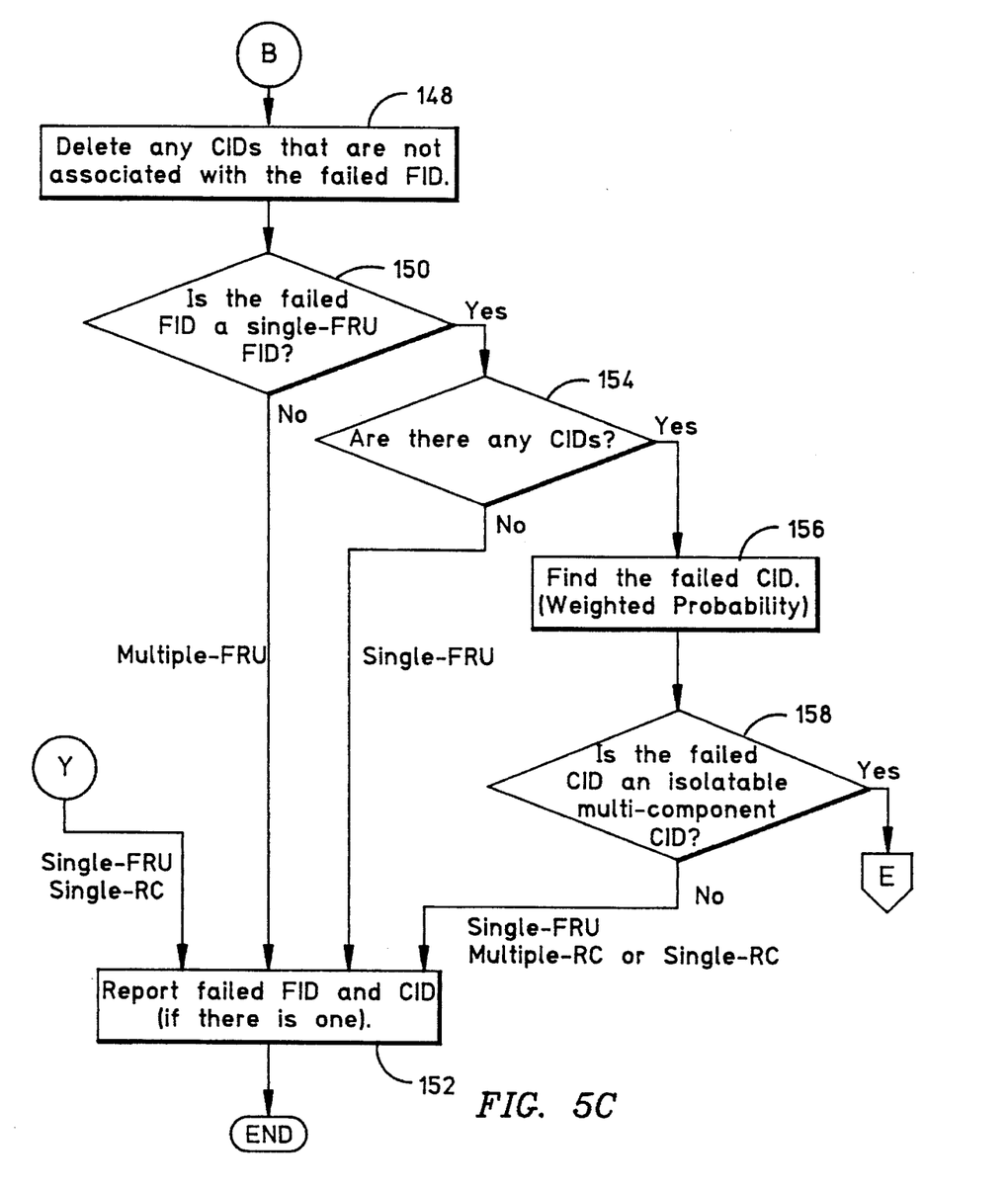
Figure 5D:
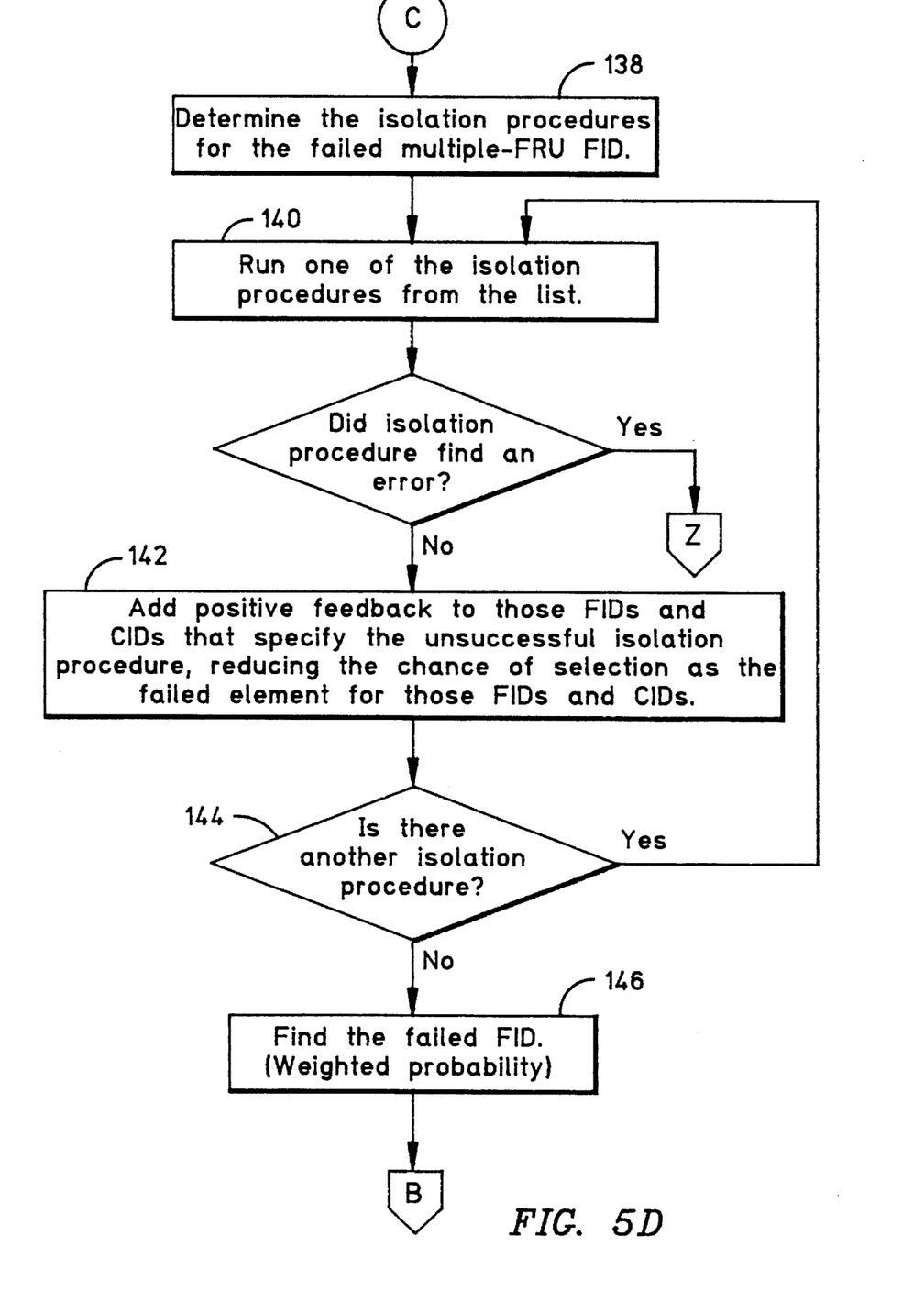

In FIG. 5C, step 148 deletes a multiplicity of irrelevant CIDs from the error stream, leaving only the maximally-probable FID from either step 126 of FIG. 5A or step 146 of FIG. 5D and any remaining associated CIDs. Step 150 tests the maximally-probable (failed) FID to determine if it is a single-FRU FID and, if it is not, immediately submits the non-isolatable (or the unsolved isolatable) multiple-FRU FID to step 152 for reporting. If the maximally-probable FID is a single-FRU FID, then the process attempts further isolation of the failed element down to the Replaceable Component (RC) or CID level. If there are no CIDs in the error stream list, step 154 then immediately reports the single-FRU FID to step 152. If there are CIDs on the list, then step 156 again computes the WFPs associated with all CIDs and selects the maximally-probable (WFP-MAX) CID. If the "failed" (maximally-probable) CID is not an isolatable multiple-RC CID, then step 158 immediately reports to step 152 the single-FRU FID from step 154 together with a maximally-probable CID, which is either a single-RC CID or a non-isolatable multiple-RC CID. Note that a branch for immediate IP execution in small CID streams may be added to this embodiment, similar to the analogous branch from step 82 (FIG. 4).

Figure 5E:
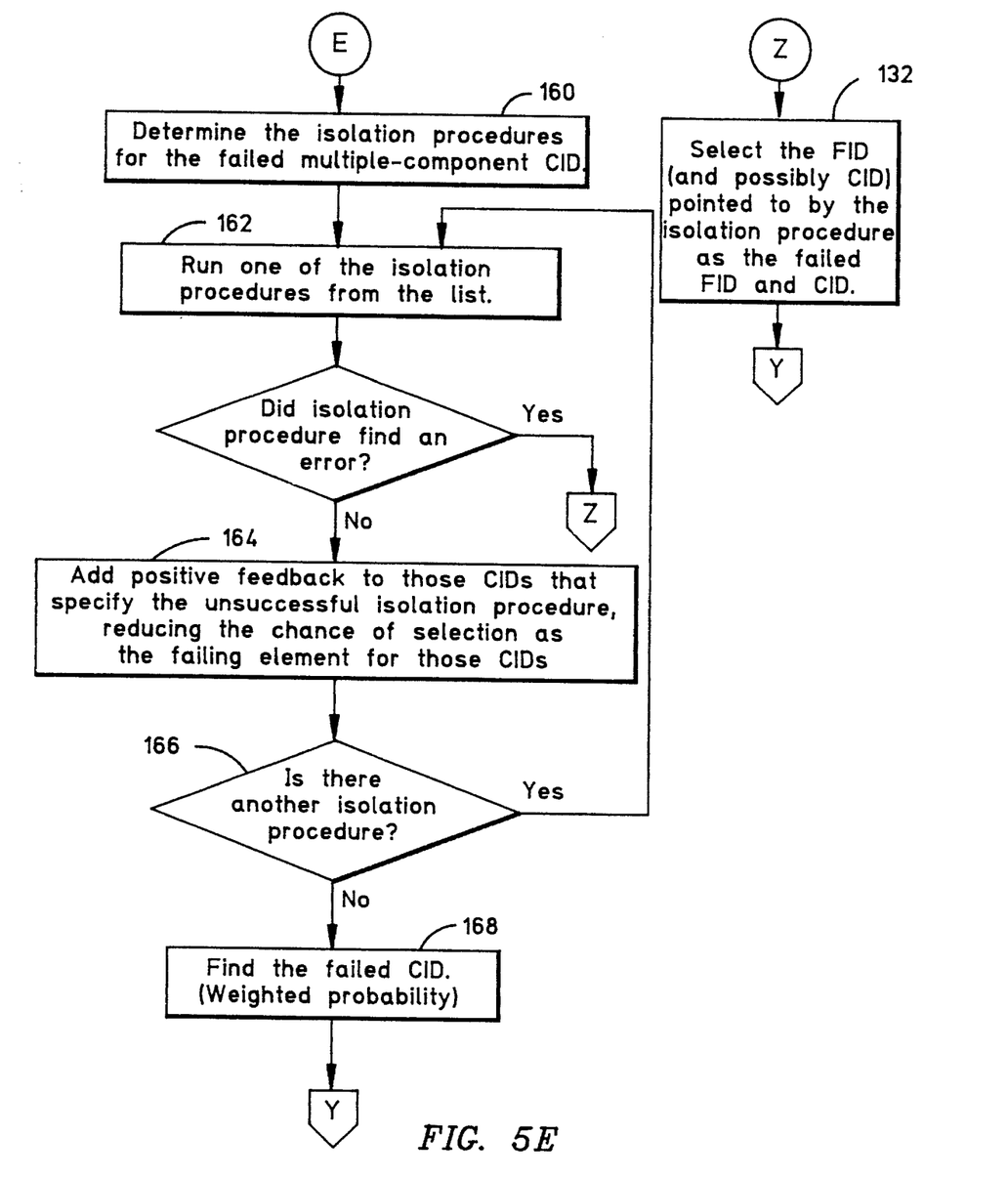

If step 158 finds that the maximally-probable CID is an isolatable multiple-RC CID, then the process proceeds to step 160 in FIG. 5E, which decompacts the multiple-RC CID and lists any associated IPs. Step 162 then executes the first of any IPs from the list and proceeds immediately to step 132 if the IP is successful. If the IP executed in step 162 is unsuccessful, then step 164 adds positive feedback to those CIDs that specify the unsuccessful IP, thereby reducing the chance of selection as the failing element for those CIDs, and may also add new FSCs to the error stream.

Steps 162–166 iterate on all listed IPs, resulting in new FSCs in the error stream from step 162 execution of one or more IPs. Finally, assuming that no IP is successful, step 168 at last computes new WFP values for all CIDs in the augmented error data stream and selects the CID having the maximum WFP value (WFP-MAX). After selecting the maximally-probable CID, the process proceeds immediately to step 152 in FIG. 5C to report the final FID and final CID found by the process of this invention.

The process of this invention is preferably embodied as microcode in a device that tracks errors by creating the error stream discussed above. This process isolates faults at least to the FID level and perhaps to the CID level. Although service personnel usually will replace only FRUs in the field, the CID information may be used either at the factory or may sometimes be used for factory-replaceable component substitution in the field. All data created by executing IPs are added to the error stream to improve the probability of isolating a final failed element. Failure probability data are used to select maximally-probable Failure Candidates (FCs) and IPs are used in the alternative to augment fault isolation. The process of this invention alternates the WFP-MAX selection procedures and the IPs to minimize isolation time and computation and maximize accuracy.

Clearly, other embodiments and modifications of this invention may occur readily to those of ordinary skill in the art in view of these teachings. Therefore, this invention is to be limited only by the following claims, which include all such embodiments and modifications when viewed in conjunction with the above specification and accompanying drawing.

We claim:

1. In a system having a plurality of elements including Field Replaceable Units (FRUs) each having one or more Replaceable Components FRCs), said system having means for producing, responsive to a failure, a plurality of error data, a machine implemented process for isolating and reporting an element failure in said system, said process comprising the steps of:

initially, detecting an element failure, followed by:

(a) in response to said element failure producing a plurality of Fault Symptom Code error data structures (FSCs) each describing a fault symptom with associated probability data and one or more Failure Candidate (FC) identifiers, said FC identifiers including FRU identifiers (FIDs) each listing one or more FRUs and RC identifiers (CIDs) each listing one or more RCs, selected ones of said FC identifiers each further including isolation procedure data for isolating one of a plurality of said FRUs or RCs;

(b) combining, for each said FID in said FSC plurality, said associated probability data with the number of times that said each FID is specified in said FSC plurality to produce a Weighted Failure Probability (WFP) for said each FID; and (c) selecting and reporting the FRU having the maximum said WFP value as a faulty FRU.

2. The machine-implemented process of claim 1 wherein said selecting step (c) comprises the steps of:

(c.1) selecting from said FSC plurality each said FID having a WFP value within a predetermined deviation from said maximum WFP value to form a first FRU group;

(c.2) selecting a first said FID that is associated with said first FRU group;

(c.3) executing one or more of any said isolation procedures associated with said first FID to identify an isolated FRU if any; and (c.4) selecting and reporting said isolated FRU if any as said faulty FRU, otherwise biasing said WFP values to reduce the contributions from said first FSC before selecting and reporting said FRU having the maximum said WFP value as said faulty FRU.

3. The machine-implemented process of claim 2 further comprising the steps of:

(d) identifying in said FSC plurality all said CIDs associated with said faulty FRU;

(e) combining, for each said associated CID in said FSC plurality, said associated probability data with the number of times that said each CID is specified in said FSC plurality to produce a second WFP value for said each associated CID; and (f) selecting and reporting the RC having the maximum said second WFP value as a faulty RC.

4. The machine-implemented process of claim 3 wherein said second selecting step (f) comprises the steps of:

(f.1) selecting from said FSC plurality each said associated CID having a second WFP value within a predetermined deviation from said maximum second WFP value to form a first RC group;

(f.2) selecting a first said FRU that is associated with said first RC group;

(f.3) executing one or more of any said isolation procedures associated with said first FRU to identify an isolated RC if any; and (f.4) selecting and reporting said isolated RC if any as said faulty RC, otherwise biasing said second WFP values to reduce the contributions from said first FRU before selecting and reporting said RC having the maximum said WFP value as said faulty RC.

5. The machine-implemented process of claim 4 wherein said producing step (a) comprises the steps of:

(a.1) if said FSC plurality is small, performing the steps of (a.1.1) executing one or more of said isolation procedures if any associated with said FSC plurality to identify an isolated FRU if any, and (a.1.2) selecting and reporting said isolated FRU if any as said faulty FRU;

otherwise (a.2) doing nothing.

6. The machine-implemented process of claim 1 wherein said producing step (a) comprises the steps of:

(a.1) if said FSC plurality is small, performing the steps of (a.1.1) executing one or more of said isolation procedures if any associated with said FSC plurality to identify an isolated FRU if any, and (a.1.2) selecting and reporting said isolated FRU if any as said faulty FRU;

otherwise (a.2) doing nothing.

7. A fault reporting system for isolating and reporting a faulty element in a system having a plurality of elements including Field Replaceable Units (FRUs) each having one or more Replaceable Components (RCs), said fault reporting system comprising:

error output means coupled to said faulty element for producing a plurality of error data structures including one or more Fault Symptom Codes (FSCs) each describing a fault symptom with associated probability data and one or more Failure Candidate (FC) identifiers, said FC identifiers including FRU identifiers (FIDs) each listing one or more FRUs and RC identifiers (CIDs) each listing one or more RCs, selected ones of said FC identifiers each further including isolation procedure data for isolating one of a plurality of said FRUs or RCs;

first combining means coupled to said error output means for combining said associated probability data with the number of times that said each FRU is specified in said FSC plurality to produce a Weighted Failure Probability (WFP) for said each FID; and FRU output means coupled to said combining means and said error output means for selecting and reporting said FRU having the maximum said WFP value as a faulty FRU.

8. The fault reporting system of claim 7 further comprising:

FRU selecting means in said FRU output means for selecting from said FSC plurality each said FID having a WFP value within a predetermined deviation from said maximum WFP value to form a first FRU group;

FSC mapping means in said FRU output means coupled to said FRU selecting means for selecting a first said FID that is associated with said first FRU group;

FRU isolating means coupled to said FRU selecting means for executing one or more of any said isolation procedures associated with said first FID to identify an isolated FRU if any; and FRU biasing means coupled to said FRU isolating means for biasing said WFP values to reduce the contributions from said first FID responsive to failure of said isolation procedures associated with said first FID.

9. The fault reporting system of claim 8 further comprising:

RC identifying means coupled to said FRU output means for identifying in said FSC plurality all said CIDs associated with said faulty FRU;

second combining means coupled to said RC identifying means for combining said associated probability data with the number of times that said each CID is specified in said FSC plurality to produce a second WFP value for said each associated CID; and RC output means coupled to said second combining means for selecting and reporting said associated RC having the maximum said second WFP value as a faulty RC.

10. The fault reporting system of claim 9 further comprising:

RC selecting means in said RC output means for selecting from said FSC plurality each said associated CID having a second WFP value within one standard deviation of said maximum second WFP value to form a first RC group;

FRU mapping means in said RC output means coupled to said second selecting means for selecting a first said FRU that is associated with said first RC group;

RC isolating means coupled to said FRU mapping means for executing one or more of any said isolation procedures associated with said first FRU to identify an isolated RC if any; and RC biasing means coupled to said RC isolating means for biasing said second WFP values to reduce the contributions from said first FRU responsive to failure of said any isolation procedures.

11. The fault reporting system of claim 7 further comprising:

RC identifying means coupled to said FRU output means for identifying in said FSC plurality all said CIDs associated with said faulty FRU;

second combining means coupled to said RC identifying means for combining said associated probability data with the number of times that said each CID is specified in said FSC plurality to produce a second WFP value for said each associated CID; and RC output means coupled to said second combining means for selecting and reporting said associated RC having the maximum said second WFP value as a faulty RC.

* * * * *